Jan. 26, 1937.    C. C. MILLER    2,069,172
SEPARATION OF GASES
Filed Nov. 25, 1933
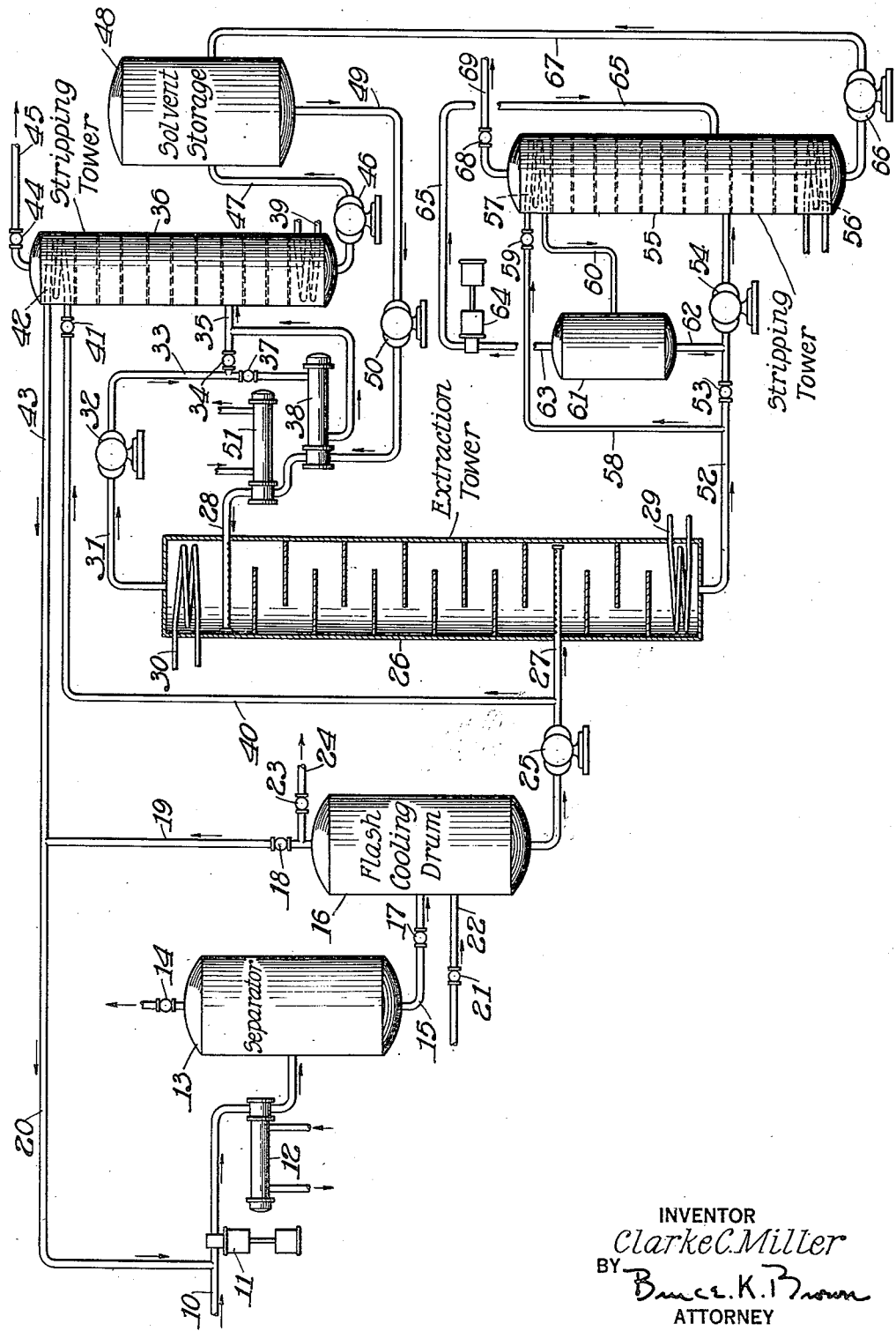
INVENTOR
*Clarke C. Miller*
BY
*Bruce K. Brown*
ATTORNEY Patented Jan. 26, 1937

2,069,172

UNITED STATES PATENT OFFICE 2,069,172

SEPARATION OF GASES

Clarke C. Miller, Wood River, Ill., assignor to Standard Oil Company, Chicago, Ill., a corporation of Indiana Application November 25, 1933, Serial No. 699,667

8 Claims. (Cl. 196—13)

My invention relates to an improved process for the separation of gaseous olefins or unsaturated hydrocarbons from gaseous paraffins or saturated hydrocarbons, and in particular to a method for the separation of liquefiable gaseous olefinic or unsaturated hydrocarbons from liquefiable paraffinic hydrocarbons.

Olefinic or unsaturated hydrocarbons of the ethylene series are available in impure form from various sources. By-product gases from oil cracking systems and from coke ovens, etc., contain such hydrocarbons in appreciable amounts. Olefinic gases may also be produced by the controlled high temperature cracking of hydrocarbon oils or of saturated hydrocarbon gases. In all these cases, however, the olefins are diluted or contaminated by hydrogen and methane in varying amounts and also by the presence of saturated hydrocarbon gases of approximately the same molecular weight and boiling point as the olefinic gases. Olefinic gases can be separated from hydrogen and methane by relatively simple and efficient means such as fractional condensation, but it is practically impossible to separate olefinic gases commercially by prior methods from paraffinic gases of corresponding molecular weight since the difference in boiling point is very slight.

It has been proposed to separate olefinic gases from paraffinic gases by scrubbing the mixture with various scrubbing agents such as aqueous solutions of various inorganic salts, certain organic solvents, etc. I have found, however, that these are ineffective commercially on account of their low efficiency.

I have found, however, that olefinic or other unsaturated gases can be separated efficiently and economically from paraffinic gases of similar molecular weight by liquefying the mixture and extracting the liquid mixture with suitable solvent as hereinafter described. Using such solvents under properly selected operating conditions, a high recovery of the desired olefins can be attained together with a high concentration of said olefins in product.

Briefly described, my invention consists of liquefying the gaseous hydrocarbons containing the olefin gases or gaseous unsaturated hydrocarbons which it is desired to recover, contacting the liquid mixture, preferably in counter-current fashion, with the selected solvent at a temperature and with a ratio of solvent to hydrocarbon such that two separate liquid phases are formed, and separating these phases. One phase will be rich in solvent and the hydrocarbons dissolved therein will contain a much higher proportion of olefins than was present in the original mixture. The other separated liquid phase will be relatively lean in solvent and the hydrocarbon admixed therewith will be relatively low in olefin content. I then separate solvent from dissolved hydrocarbons separately, returning the solvent to the process and obtaining as product a mixture rich in olefins or unsaturated gases and as by-product a mixture containing mainly saturated hydrocarbon gases.

I have found that suitable solvents for this process include various groups or classes of organic compounds which are generally characterized by the possession of an active group or nucleus. It should be emphasized that there is no apparent chemical reaction between the solvent and the olefinic gases in the sense that permanently stable compounds are formed, but it seems probable that loosely bound addition compounds may be formed between the olefins and the active nuclei or groups of the solvent, these compounds being broken up once more by the stripping operation. It should be understood that this explanation is offered as a suggestion and that I do not limit myself thereto.

The various groups or classes of organic solvents which I have found to be suitable and useful in my process include alcohols, ethers, esters, chlorinated organic oxygen compounds such as chlorinated ethers and chlorinated alcohols, aromatic nitro compounds, phenols, aldehydes, and amines and other basic nitrogen-containing carbon organic compounds.

Useful solvents for my process are further characterized by the fact that their "critical solution temperature" for liquefied gaseous hydrocarbons should not be below about —60° F. With a given solvent and a given ratio of solvent to liquefied hydrocarbons there is, of course, a temperature of complete miscibility. This temperature may vary considerably with the ratio of solvent to liquid hydrocarbons but with any given solvent there will be some temperature above which the solvent and the liquid hydrocarbons are miscible in all proportions. This temperature is known as the "critical solution temperature", hereinafter called C. S. T. I have found that the process must be carried out at temperatures below the C. S. T. in order that two phases, one rich in desired constituents and the other rich in undesired constituents, may be obtained. The allowable upper limit of the extraction temperature, in addition to the limitation that it must be below the C. S. T., is also determined by the pressure which may be carried upon the apparatus. This will vary considerably, depending on whether the hydrocarbon mixture under treatment comprises ethane-ethylene, propane-propylene, butane-butylene, etc. The pressure on the apparatus must be sufficient to maintain the hydrocarbon mixture in liquid form. For ethane-ethylene mixtures the pressure at 90° F. is something over 720 lbs. per sq. in. absolute while for propane-propylene it is approximately 180 lbs./sq. in. absolute and for butane-butylene in the vicinity of 70 lbs./sq. in. absolute. It is evident, therefore, that a solvent having C. S. T. of 100° F. might be used efficiently for a propane-propylene mixture whereas this would introduce considerable difficulties for the treatment of ethane-ethylene.

It is also desirable that the solvent be normally liquid in order that mixing and contacting with the hydrocarbons under treatment may be carried out efficiently.

The various classes of solvents which I have found useful in my process are as follows:

Aliphatic alcohols, or aliphatic compounds containing a hydroxyl group in addition to some other group (i. e. such as keto-alcohols) may be used provided the C. S. T. is above −60° F. Alcohols giving a lower C. S. T. than −60° F. may be diluted with a small amount of water thus raising their C. S. T to a desirable value. For example, 100% and 95% ethyl alcohol with a propane-propylene mixture have a C. S. T. below −60° F. but a mixture of 90% ethyl alcohol and 10% water shows the following miscibility temperatures:

| Solvent ratio hydro-carbons | Miscibility temp. °F. |
|---|---|
| 1.5/1 | 70 |
| 1/1 | 50 |
| 0.66/1 | 0 |

Miscibility data for anhydrous methyl alcohol are as follows:

| Solvent ratio hydro-carbons | Miscibility temp. °F. |
|---|---|
| 4/1 | −35 |
| 3/1 | −30 |
| 2/1 | −37 |

Miscibility data for diacetone alcohol are as follows:

| Solvent ratio hydro-carbons | Miscibility temp. °F. |
|---|---|
| 5/1 | 30 |
| 3/1 | 33 |
| 2/1 | 28 |
| 1/1 | 12 |

Other alcohols such as propyl alcohol, butyl alcohol, etc., or polyhydric alcohols such as ethylene glycol, glycerine, or diethylene glycol, or mixture of two or more alcohols may be used subject to the above limitations.

Chlorinated derivatives of aliphatic oxygen compounds are also used. For example, $\beta\beta$ dichlor diethylether shows the following miscibility temperatures with propane-propylene:

| Solvent ratio hydro-carbons | Miscibility temp. °F. |
|---|---|
| 5/1 | 34 |
| 1.5/1 | 47 |
| 1/1 | 45 |

This solvent may be used at temperatures below those shown for the solvent ratio chosen. Ethyl chlorhydrin has a C. S. T. above 100° while propylene chlorhydrin has a C. S. T. of 105° F. Other compounds of this class which I have found useful in my process are $\beta\beta$ dichlor dipropylether, $\beta$ chlorethyl methyl ether and butylene chlorhydrin Aromatic basic nitrogen-containing compounds which I have found useful as solvents include pyridine which with propane-propylene mixtures has a C. S. T. of about 0° F., aniline which has a C. S. T. of more than 100° F., methyl and dimethyl pyridine, toluidine, methyl and dimethyl aniline and chloro aniline.

Aromatic hydroxy compounds may be used, such as phenol and cresol (both of which have a C. S. T. of more than 100° F. with propane-propylene mixtures) xylenol, chlorophenol, ethyl phenol and propyl phenol.

Aromatic nitro compounds may be used as solvents. Nitrobenzol for example shows the following miscibility data with porpane-propylene mixtures:

| Solvent radio hydro-carbons | Miscibility temp.°F. |
|---|---|
| 5/1 | 107 |
| 2/1 | 120 |
| 1/1 | 77 |
| 0.5/1 | 50 |

Other nitro compounds which may be used are mononitro toluene, mononitro xylene.

I have also found that furfural which has a C. S. T. with propane-propylene mixtures of above 85° F. may be used as a solvent.

The foregoing solvents may also be used in mixture with one or more other solvents of the classes described. Under certain circumstances it is sometimes advantageous to use one or more of the foregoing solvents together with a certain proportion of a diluent such as, for example, a suitable light or medium hydrocarbon oil such as light or heavy virgin naphtha, light or heavy cracked naphtha, light gas oil, etc. Diluents such as aromatic hydrocarbons including benzol, toluol, and other compounds of this series may also be used.

As specific examples of my process the following batch experiments may be noted. Starting with a mixture of propane and propylene containing 25.6% propylene by volume, 1.68 lbs. of the mixture was shaken at 30° F. with 3.40 lbs. of cresylic acid. Separation of the two layers and separate recovery of the hydrocarbons in each layer gave 0.78 lb. of a hydrocarbon mixture containing 21.0% propylene by volume and 0.92 lb. of a hydrocarbon mixture containing 29.3% propylene by volume. Under counter-current extraction conditions, instead of batch extraction much sharper separation can be obtained.

In another example, 1115 grams of the same propane-propylene mixture was extracted at 95° with 1480 grams of phenol. Separation and recovery of the two hydrocarbon fractions gave 418 grams of a mixture containing 22.0% propylene by volume and 670 grams of a mixture containing 28.9% propylene by volume.

I have previously described briefly the operation of my process.

The process may be described more fully as follows:

Referring to the drawing attached hereto which forms part of this specification, this represents a diagrammatic elevational view of apparatus suitable for carrying out my process.

The gaseous mixture of olefinic and paraffinic gases enters the system through line 10 and is compressed by compressor 11 to a suitable pressure up to about 300 lbs. per sq. in., sufficient after cooling in cooler 12 to liquefy the liquefiable gases present. The compressed and partially liquefied gases are then passed into separator 13 where any non-liquefied gases are withdrawn through valve 14. The liquefied gases then pass through line 15 into flash cooling drum 16, the pressure being reduced slightly at valve 17 so as to permit partial evaporation for the purpose of self refrigeration of the liquefied materials. The gases formed by vaporization in drum 16 are removed through valve 18 and pass through line 19 and line 20 to the inlet of compressor 11, thus being reliquefied and returned to the system. By this means the temperature of the liquefied materials in drum 16 is reduced to a temperature equal to or below the desired extraction temperature. Drum 16 may also be supplied with previously liquefied gases from an external source such as a pressure distillate stabilizer operated in conjunction with a cracking system, etc., in which case the liquefied gases are supplied through valve 21 in line 22 and the gases formed in drum 16 by vaporization may be removed through valve 23 in line 24 and returned to a suitable point in the external system.

Cooled liquefied materials are withdrawn from drum 16 by pump 25 and are introduced into vertical extraction tower 26 through line 27, which is positioned at an intermediate low point therein. In tower 26 the liquefied hydrocarbon materials rise by differential gravity action being displaced by the heavier solvent introduced into tower 26 through line 28 at an intermediate high point in the tower, and are thus counter-currently contacted with the solvent. Tower 26 may also be provided with bottom cooling coil 29 and top cooling coil 30 whereby improved separation may be attained.

From the top of tower 26 undissolved liquefied hydrocarbons of predominating saturated character containing a certain amount of solvent dissolved therein are removed through line 31 and are pumped by pump 32 through line 33 and valve 34 in line 35 to stripping tower 36. A part of this material may be diverted through valve 37, passing through heat exchanger 38 in heat exchange relationship with stripped solvent entering tower 26 whereby the solvent is cooled. Pressures in tower 36 will ordinarily be lower than the pressure in extraction tower 26 and may be as low as atmospheric pressure depending on the boiling point of the solvent in use. Stripping tower 36 is provided with heating coil 39 or equivalent heating means in the base thereof and is provided with suitable cooling or reflux means in the top thereof, which may include means for supplying open reflux into the tower. In the drawing I have illustrated one possible cooling means for the top of tower 36 which comprises withdrawing a small proportion of the liquefied gas from line 27 before it enters extraction tower 26, passing same through line 40 and expanding at valve 41 through cooling coils 42 in tower 36 and returning the expanded vapors through line 43 and line 20 to the inlet of compressor 11. Suitable temperatures and pressures are maintained in tower 36 to strip the undissolved and undesired hydrocarbon from the solvent. The hydrocarbons are removed through valve 44 in line 45 and may be used as fuel or for any other purposes. The stripped solvent is withdrawn from the bottom of tower 36 by pump 46 and passes through line 47 to solvent storage drum 48.

From drum 48 the solvent is returned through line 49 and pump 50 through heat exchanger 38 wherein it is cooled, and if necessary is then passed through cooler 51 wherein it is cooled to a temperature approximately equal to or lower than that which it is desired to maintain in extraction tower 26.

Returning to extraction tower 26, the solvent plus desired dissolved olefins is removed from the bottom through line 52, and passes through valve 53 and pump 54 into stripping tower 55. Tower 55 will ordinarily be maintained at a lower pressure than extraction tower 26. Tower 55 is provided with heating means 56 in the base thereof and is provided with suitable cooling or reflux means, which may include open reflux, in the upper part thereof. In the drawing I have illustrated a cooling coil 57 in the upper part of tower 55 which is cooled by withdrawing a part of the solvent plus dissolved liquefied olefin gas from line 52 through line 58, expanding same at valve 59 to provide a refrigerant effect in coil 57, passing expanded products through line 60 to separator 61, from which the unvaporized material passes through line 62 to the inlet of pump 54, while vaporized gases are withdrawn through line 63, recompressed if necessary by compressor 64 and passed through line 65 to an intermediate point in stripping tower 55.

Stripped solvent is removed from the base of tower 55 by pump 66 and passes through line 67 to solvent storage drum 48. Olefinic gases are removed from tower 55 through valve 68 in line 69 after which they are stored or utilized for desired purposes.

The temperatures and pressures carried at various points in the system are governed by the particular mixture of gases in use, by the particular solvent used and by the form in which the final products are desired. For example, with a given solvent of moderate or high boiling character and having a moderately low C. S. T. it would be desirable to operate the stripping towers 36 and 55 at moderately low temperature and approximately atmospheric pressure, provided that the products are desired in gaseous form. If however, it is desired to obtain the paraffinic product and the olefinic product respectively in liquid from the towers 36 and 55 may be operated at higher temperature and at sufficiently higher pressure so that the gaseous products removed through lines 45 and 68 respectively can be liquefied by subsequent cooling without further compression.

The gaseous mixtures to which my process may be applied may be any mixture of normally gaseous unsaturated and paraffinic hydrocarbons which may be liquefied and maintained in liquid form under the prevailing temperature and pressure in my extraction system. This includes ethane, propane, butane or any of them including their isomers in admixture with ethylene, propylene, butylene or any of them including isomers. Small amounts of higher boiling materials may also be present. Ordinarily, however, my process is particularly applicable to mixtures wherein the olefinic and paraffinic hydrocarbons contain the same number of carbon atoms. Diolefinic gases and acetylenic gases may also be separated from saturated gases. I may also separate diolefins from olefins, or acetylenic gases from olefins.

It will be understood that whereas the foregoing is a full and complete description of my invention, I am not limited therein except as expressed in the claims as follows.

I claim:

1. The process of separating normally gaseous unsaturated hydrocarbons from normally gaseous saturated hydrocarbons, which comprises liquefying a mixture thereof, maintaining said mixture of hydrocarbons under pressure sufficient to maintain the hydrocarbons in liquefied form, extracting said liquefied mixture with an incompletely miscible organic solvent having greater solvent power for the unsaturated hydrocarbons than for the saturated hydrocarbons, and separating the solvent and hydrocarbons in solution therein from the remainder of the liquefied hydrocarbons prior to any distillatory step.

2. The process of separating normally gaseous unsaturated hydrocarbons from normally gaseous saturated hydrocarbons, which comprises liquefying a mixture thereof, maintaining said mixture of hydrocarbons under pressure sufficient to maintain the hydrocarbons in liquefied form, extracting said liquefied mixture with an incompletely miscible normally liquid organic solvent having greater solvent power for the unsaturated hydrocarbons than for the saturated hydrocarbons, and separating the solvent and hydrocarbons in solution therein from the remainder of the liquefied hydrocarbons prior to any distillatory step.

3. The process of separating normally gaseous unsaturated hydrocarbons from normally gaseous saturated hydrocarbons, which comprises liquefying a mixture thereof, maintaining said mixture of hydrocarbons under pressure sufficient to maintain the hydrocarbons in liquefied form, extracting said liquefied mixture with an organic solvent having a critical solution temperature for the hydrocarbons under treatment greater than $-60°$ F. and having greater solvent power for the unsaturated hydrocarbons than for the saturated hydrocarbons, and separating the solvent and hydrocarbons in solution therein from the remainder of the liquefied hydrocarbons prior to any distillatory step.

4. The process of separating normally gaseous unsaturated hydrocarbons from normally gaseous saturated hydrocarbons, which comprises liquefying a mixture thereof, maintaining said mixture of hydrocarbons under pressure sufficient to maintain the hydrocarbons in liquefied form, extracting said liquefied mixture with an aliphatic alcohol having a critical solution temperature for the hydrocarbons under treatment greater than $-60°$ F. and having greater solvent power for the unsaturated hydrocarbons than for the saturated hydrocarbons, and separating the solvent and hydrocarbons in solution therein from the remainder of the liquefied hydrocarbons prior to any distillatory step.

5. The process of separating normally gaseous unsaturated hydrocarbons from normally gaseous saturated hydrocarbons, which comprises liquefying a mixture thereof, maintaining said mixture of hydrocarbons under pressure sufficient to maintain the hydrocarbons in liquefied form, extracting said liquefied mixture with an aliphatic alcohol containing sufficient water to raise its critical solution temperature for the hydrocarbons under treatment to a temperature greater than $-60°$ F. and having greater solvent power for the unsaturated hydrocarbons than for the saturated hydrocarbons, and separating the solvent and hydrocarbons in solution therein from the remainder of the liquefied hydrocarbons prior to any distillatory step.

6. The process of separating normally gaseous unsaturated hydrocarbons from normally gaseous saturated hydrocarbons, which comprises liquefying a mixture thereof, maintaining said mixture of hydrocarbons under pressure sufficient to maintain the hydrocarbons in liquefied form, extracting said liquefied mixture with an incompletely miscible chlorinated derivative of an aliphatic oxygen compound having greater solvent power for the unsaturated hydrocarbons than for the saturated hydrocarbons, and separating the solvent and hydrocarbons in solution therein from the remainder of the liquefied hydrocarbons prior to any distillatory step.

7. The process of separating normally gaseous unsaturated hydrocarbons from normally gaseous saturated hydrocarbons, which comprises liquefying a mixture thereof, maintaining said mixture of hydrocarbons under pressure sufficient to maintain the hydrocarbons in liquefied form, extracting said liquefied mixture with an incompletely miscible phenolic compound having greater solvent power for the unsaturated hydrocarbons than for the saturated hydrocarbons, and separating the solvent and hydrocarbons in solution therein from the remainder of the liquefied hydrocarbons prior to any distillatory step.

8. The process of separating normally gaseous unsaturated hydrocarbons from normally gaseous saturated hydrocarbons, which comprises liquefying a mixture thereof, maintaining said mixture of hydrocarbons under pressure sufficient to maintain the hydrocarbons in liquefied form, extracting said liquefied mixture with an aliphatic alcohol containing about 10% water, said mixture of alcohol and water having a greater solvent power for the unsaturated hydrocarbons than for the saturated hydrocarbons, and being immiscible with said liquefied hydrocarbon gases at the temperature of extraction, and separating the solvent and hydrocarbons dissolved therein from the remainder of the liquefied hydrocarbons prior to any distillatory process.

CLARKE C. MILLER.